United States Patent Office 3,467,629
Patented Sept. 16, 1969

3,467,629
COPOLYMERS OF ACRYLONITRILE AND
PROCESS FOR PREPARING SAME
Rudi Mayer, Leverkusen-Fettehenne, and Carlhans Süling,
Leverkusen, Germany, assignors to Farbenfabriken
Bayer Aktiengesellschaft, Leverkusen, Germany, a corporation of Germany
No Drawing. Filed Mar. 28, 1967, Ser. No. 626,398
Claims priority, application Germany, Apr. 9, 1966,
F 48,914
Int. Cl. C08f 15/22, 15/40
U.S. Cl. 260—79.3          4 Claims

ABSTRACT OF THE DISCLOSURE

Copolymers of acrylonitrile are produced which contain at least 80% by weight acrylonitrile monomer by copolymerising acrylonitrile and an ethylenically unsaturated neutral comonomer, together with a betaine in an aqueous medium at pH below 7.

---

The present invention relates to acrylonitrile polymer compositions and to a process for the preparation of acrylonitrile copolymers which are suitable for the production of fibres.

It is already known that copolymers having fibre-forming properties may be obtained from acrylonitrile and up to 15% by weight of monomers which contain acidic or basic groups. By adjusting the composition of the copolymer, one is able to modify the raw material for the production of the fibre in order to achieve the desired textile properties and dyeing properties. The production of fibre-forming acrylonitrile copolymers which show increased affinity to basic dyes has already been proposed. This can be achieved by copolymerisation with monomers which contain sulphonic acid groups, such as styrene sulphonic acid, or with methacryloylaminoarylsulphonic acids. By copolymerisation of acryonitrile with, for example, vinyl pyridine, one may, alternatively, produce polymers which show increased affinity to acid dyes.

The polymers obtained by such processes suffer the disadvantages that only one of the said classes of dyes can be used in each case for dyeing fibres obtained from such modified polymers. Furthermore, processes are already known whereby ternary copolymers with an affinity for dyes may be obtained by copolymerisation of acrylonitrile with acid and with basic monomers or by copolymerisation of acrylonitrile with monomers which contain in the molecule groups containing both a basic function and an acid function, in other words betaines.

The production of fibre-forming acrylonitrile copolymers from three components suffers the disadvantage that the three different monomers must of necessity have different polymerisation activities, so that it is very difficult to make the process as accurately reproducible as required. Another disadvantage lies in the low thermal stability of the known copolymers of acrylonitrile and betaines when comonomers which contain, for example, the group

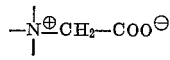

are used, and in the unsatisfactory adjustment of the affinities to the different classes of dyes to comonomers which contain the group

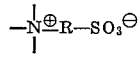

It has now been found that acrylonitrile copolymers having improved thermostability and improved adjustment of the affinity to different classes of dyes and containing at least 80% of acrylonitrile are obtained if acrylonitrile, if desired together with ethylenically unsaturated non-ionic monomers, is copolymerised with a betaine of the following formula

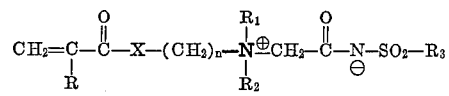

in such quantities that the sum of non-ionic monomers is at least 90% by weight of copolymerisation components. In the general formula, R represents a hydrogen atom or a methyl group, X represents —O— or

$R_1$ and $R_2$ the same or different alkyl radicals, $R_3$ an alkyl or aryl radical, $R_4$ a hydrogen atom or an alkyl radical and $n$ is an integer of from 1 to 6 inclusive. The betaines of the above formula contain an acryloyl or methacryloyl residue as the polymerisable group, and can be obtained by reacting compounds of the following general formula

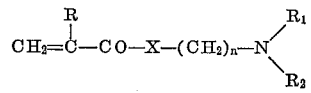

in which R, $R_1$, $R_2$ and X have the meaning indicated above with haloacetylsulphonamides of the general formula Hal—$CH_2$—CO—NH—$SO_2$—$R_5$ in which Hal stands for chlorine, bromine or iodine and $R_5$ is an alkyl or aryl radical which may be substituted.

For example, the betaine of the following formula

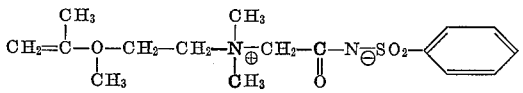

may be prepared as follows:

65.0 parts (0.4 mol) of dimethylaminoethylmethacrylate and 50.0 parts (0.2 mol) of chloroacetylbenzenesulphonamide of melting point 123 to 124° C. are dissolved in 300 parts of acetonitrile, and heated to 70° C. for 3 to 5 hours after the addition of 0.5 part of tertiary butylpyrocatechol and 0.5 part of phenothiazine. After cooling, the dark solution is treated with twice its volume of acetone, and the crystalline deposit obtained is separated by filtration under suction and is washed with acetone. 59.0 parts (=83% of the theoretical) of colourless crystals of melting point 82 to 84° C. are obtained (in a preheated bath, sintered from 79° C. upwards). The compound is readily soluble in warm water and in strongly polar solvents, as well as in dilute acids, and can easily be recrystallised from an aqueous solution of sodium chloride or acetone.

Alternative amine components to dimethylaminoethylmethacrylate are, for example, diethylaminoethyl methacrylate, dipropylaminoethylmethacrylate, dibutylaminoethylmethacrylate, dimethylaminoethylacrylate, diethylaminoethylacrylate, dimethylaminopropylmethacrylate, dimethylamino butylmethacrylate, dimethylaminohexylmethacrylate and diethylaminohexylmethacrylate, and the corresponding acrylates, dimethylaminoethylmethacrylamide, dimethylaminobutylmethacrylamide, diethylaminoethylmethacrylamide, diethylaminobutylmethacrylamide, dimethylaminoethylacrylamide, dimethylaminobutylacrylamide, diethylaminoethylacrylamide and diethylaminobutylacrylamide. Alternative haloacetylsulphonamides to chloroacetyl benzene sulphonamide, are chloroacetyltoluenesulphonamide, chloroacetylnitrobenzene sulphonamide, chloroacetylmethanesulphonamide, chloroacetyl propanesulphonamide, chloroacetylbutane sulphonamide, bromoacetylbenzenesulphonamide and bromoacetyltoluenesulphonamide.

Copolymerisation of these new monomers with acrylonitrile may be carried out in aqueous dispersion. Furthermore, in order to achieve rapid polymerisation, it is advisable to use a redox system as the activator system. It is particularly advantageous to carry out polymerisation in aqueous dispersion at pH values below 7 preferably using a mixture of persulphates and compounds of tetravalent sulphur, for example, potassium persulphate and sodium pyrosulphate as activator system. When redox systems are employed, the reducing components are preferably added in excess. The reaction temperature should generally be in the region of 35 to 60° C. but under special conditions, e.g. if polymerisation is carried out by particular methods, it is, of course, also possible to polymerise at temperatures of 15 to 35° C. One may also use in addition, emulsifiers and dispersing agents, e.g. for improving the conditions for working up the polymer. In order to obtain acrylonitrile copolymers with desirable properties, one may polymerise acrylonitrile with both a neutral comonomer, and the betaines according to the present patent application. The monomers being present in the unpolymerized mixture within the following ranges: Acrylonitrile 80 to 95% by weight, betaine 2 to 10% by weight and the additional neutral comonomer 3 to 18% by weight. The acrylonitrile content should, however, amount to at least 80% and the sum of neutral monomers should be at least 90% by weight of the compounds which are copolymerised. Suitable neutral comonomers are monomers which have substantially the same reactivity as acrylonitrile, and in particular, alkyl esters of acrylic acid, acrylic acid amides, methacrylic acid esters and methacrylic acid amides.

Acrylic acid ester and methacrylic acid esters of low alcohols ($C_1$ to $C_4$) are particularly suitable for use as neutral comonomers.

The polymers may be spun wet or dry from solutions, or worked up into films. The films and filaments are dyed with acid and basic dyes by the usual processes.

EXAMPLE

After replacement of the air in a polymerisation vessel by nitrogen, 100 parts by weight of de-ionised water and 0.02 part by weight of sulphuric acid are introduced therein.

Polymerisation is then carried out by introducing the following solutions into the polymerisation vessel simultaneously and at the same rate.

Solution I

| | Parts by weight |
|---|---|
| Potassium persulphate | 0.4 |
| De-ionised water | 300 |
| Sulphuric acid | 0.07 |

Solution II

| | |
|---|---|
| Sodium pyrosulphate | 1.0 |
| De-ionised water | 300 |

Solution III

| | |
|---|---|
| Acrylonitrile | 95 |
| Methylacrylate | 3 |
| Product of quaternisation of dimethylaminoethylmethacrylate with N-benzenesulphonylchloroacetamide | 3 |

After conversion of about 90% of the reactants, the polymer paste which is obtained is filtered off and dried after the residual monomers and catalysts have been washed out. The pure white polymer obtained can be dyed with both acidic and basic dyes. The K-value of the polymer is 90.

What we claim is:

1. A normally solid random copolymer of acrylonitrile comprising in copolymerised form (a) acrylonitrile, (b) a betaine of the formula

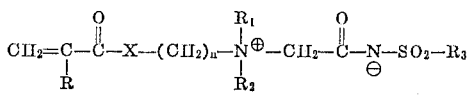

wherein R represents hydrogen or methyl; X represents —O— or

$R_1$ and $R_2$ are lower alkyl groups; $R_3$ is selected from the group consisting of alkyl containing 1–4 carbon atoms, phenyl, tolyl, and nitrophenyl; $R_4$ is hydrogen or an alkyl radical; and $n$ is an integer from 1 to 6, and (c) an additional neutral comonomer selected from the group consisting of an acrylic acid ester, acrylic acid amide, a methacrylic acid ester and methacrylic acid amide, said acrylonitrile being present in a range of 80 to 95% by weight, said betaine in a range of 2 to 10% by weight and said additional neutral comonomer in a range of 3 to 18% by weight.

2. The copolymer of claim 1, wherein said betaine is

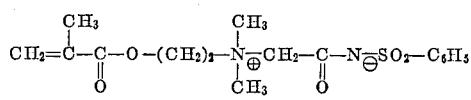

3. The copolymer of claim 1, wherein said additional neutral comonomer is acrylic acid methylester.

4. A process for the preparation of acrylonitrile copolymers containing at least 80% by weight of acrylonitrile monomer, which comprises copolymerising acrylonitrile, and an additional neutral comonomer selected from the group consisting of an acrylic acid ester, acrylic acid amide, a methacrylic acid ester and methacrylic acid amide, together with a betaine of the formula

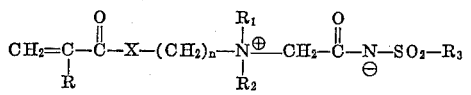

wherein R represents hydrogen or methyl; X represents the group —O— or

$R_1$ and $R_2$ are the same or different lower alkyl radicals; $R_3$ is selected from the group consisting of alkyl containing 1 to 4 carbon atoms, phenyl, tolyl, and nitrophenyl; $R_4$ is hydrogen or an alkyl radical; and $n$ is an integer of from 1 to 6, wherein the sum of the acrylonitrile and neutral comonomer is at least 90% by weight of the copolymerisation components, said copolymerising being carried out in an aqueous medium at pH values below 7.

References Cited

UNITED STATES PATENTS

| 2,566,162 | 8/1951 | Caldwell | 260—79.3 |
| 3,256,252 | 6/1966 | Kruckenberg | 260—79.3 |

JAMES A. SEIDLECK, Primary Examiner

U.S. Cl. X.R.

260—486